March 2, 1954     R. D. VAN MILLINGEN     2,670,598
GAS TURBINE PLANT WITH MULTIPLE FLUID OPERATED MOTORS
Filed Nov. 13, 1951     3 Sheets-Sheet 2

Inventor
Benel D. van Millingen
By Babcock & Babcock
Attorney

March 2, 1954  R. D. VAN MILLINGEN  2,670,598
GAS TURBINE PLANT WITH MULTIPLE FLUID OPERATED MOTORS
Filed Nov. 13, 1951  3 Sheets-Sheet 3

Inventor
Renel D. van Millingen
By Babcock & Babcock
Attorney

Patented Mar. 2, 1954

2,670,598

UNITED STATES PATENT OFFICE 2,670,598

GAS TURBINE PLANT WITH MULTIPLE FLUID OPERATED MOTORS

Reuel Duncan van Millingen, Ravensthorpe, England, assignor to The English Electric Company Limited, London, England, a British company Application November 13, 1951, Serial No. 255,980

Claims priority, application Great Britain November 17, 1950

13 Claims. (Cl. 60—39.15)

The invention relates to plant comprising a dynamic compressor, particularly gas turbine power plant. As is well known, dynamic compressors, whether of the axial, radial or mixed flow type, are liable to surge when the mass flow actually delivered by the compressor to a consumer of varying quantities of the compressed medium, for example of the compressed air delivered to the combustion chamber of the gas turbine delivering useful power in a gas turbine powerplant, drops below a predetermined percentage of the rated mass flow at a certain speed of rotation, for which the compressor is designed.

It is an object of the present invention to provide a plant of the kind referred to in which surging of the dynamic compressor thereof is avoided.

It is another object of the invention to provide a gas turbine power plant of the kind referred to wherein surging of the dynamic compressor thereof upon the power turbine thereof reaching an overspeed condition is obviated and the plant is restored to an equilibrium position in which the output of the dynamic compressor matches the requirement of the gas turbines in compressed air.

It is yet another object of the invention to provide a method for the control of a plant of the kind referred to whereby surging of the dynamic compressor thereof is avoided.

It is still another object of the invention to provide a method for the control of a gas turbine power plant of the kind referred to whereby surging of the dynamic compressor thereof upon the power turbine thereof reaching an overspeed condition is obviated and the plant is restored to an equilibrium position in which the output of the dynamic compressor matches the requirement of the gas turbines in compressed air.

Automatically controlled blow-off devices have been proposed to ensure a sufficient mass flow to be delivered by the compressor, even if the consumption of the compressed gaseous medium by the consumer supplied by the compressor drops below the permissible value.

For example in gas turbine power plant comprising a power turbine driving the useful load and a separate charging set consisting of an independently rotatable gas turbine driving a dynamic compressor which supplies the combustion chamber or chambers of both gas turbines with compressed air, a blow-off valve controlled by a device has been proposed which is responsive to the pressure difference between pitot pressure and static pressure in a venturi arranged in the delivery of the compressor in a sense of opening a blow-off valve when this pressure difference falls as a consequence of reduced mass flow and vice versa, and also responsive to the static pressure (gauge) in the said venturi in the sense of opening the blow-off valve when the said pressure (gauge) rises, and vice versa. However, it has been found that for some applications this known type of automatic blow-off control does not act quickly enough to prevent surging.

According to a main feature of the invention the slow acting blow-off regulator of the known kind is combined with a quick-acting device which is operatively connected to the control member reducing the mass flow to the consumer and which preferably opens the blow-off valve to a greater extent than is required to compensate for the reduction of mass flow to the consumer brought about by the action of the said control member, whereby the action of the slow-acting blow-off regulator is anticipated. The said slow-acting blow-off regulator however establishes an equilibrium condition of sufficient mass flow after the rapid action of the quick-acting device has ceased.

According to a main feature of the gas turbine power plant according to the invention the same is provided with a dual speed control means for the power turbine, namely one slow-acting control means responsive to small deviations of the actual speed of the power turbine from its set speed, and a quick-acting device responsive to large deviations of the actual speed of the power turbine from its set speed such as may be brought about by changes of load or by alterations of the speed setting of the power turbine.

According to a main feature of the method according to the invention the slow-acting control means acts automatically on the fuel supply to the charging turbine and thereby adjusts its speed and that the compressor driven by it to the requirements of the power turbine in motive fluid, the rate of change of speed of the charging set being for example in the order of magnitude of 3% per minute, whereas the quick-acting device automatically moves a normally open throttle in the connection between the compressor delivery and the power turbine inlet in a closing direction with the power turbine reaches an overspeed condition exceeding a first predetermined value (say 2% above the set speed) and fully closes this throttle at an overspeed condition of a higher predetermined value (say 7% above the set speed) regardless of whether these overspeed conditions are brought about by an increase of the actual speed of the power turbine or by a change of the speed setting thereof to a lower speed. The fastest movement of the throttle from the fully open to the fully closed position takes approximately ⅓ second.

Upon the power turbine reaching an underspeed condition by a fall of the actual speed thereof or a change of its speed setting to a higher speed, the fuel supply to, and accordingly the speed and output of, the charging set is increased either automatically by the said slow-acting control means or by an overriding manual control means capable of being operated at will before any change of the speed setting of the power turbine to a higher speed, whereby the increased demand in motive fluid of the power turbine is anticipated by the speeding up of the charging set and the whole power plant is brought into an overspeed condition which is controlled as set forth hereinabove, by the partial closing of the throttle.

For example in the gas turbine power plant of the kind referred to, surging of the compressor of the charging set is prevented under low load operation or overspeed conditions of the power turbine, by preventing the quantity of air delivered by it to the pressure turbine from dropping below—say 0.95—of the quantity delivered under normal operating conditions by a blow-off valve arranged upstream of the said throttle which, under lasting low load conditions, is operated by a slow-acting blow-off regulator responsive to the speed of flow of that part of the compressed air which normally goes to the power turbine, said blow-off regulator taking a period of the order of 1 to 5 seconds to move the blow-off valve through its full travel. In the event of a sudden closing of the throttle, the action of the said blow-off regulator is anticipated by a quick-acting device connected operatively with the throttle control so as to open the blow-off valve to a greater extent than is required to compensate for the reduction of flow to the power turbine brought about by the closing movement of the throttle. When the throttle reaches a steady position this excess opening of the blow-off valve is counteracted by the normal action of the blow-off regulator, until the flow bled-off from the charging set is reduced to 0.95 of its normal value.

Undue rise of the outlet temperature of the power turbine at low load conditions is prevented by an auxiliary blow-off from the hot air outlet manifold of the heat exchanger of the power turbine according to a further development of the invention, whereby the mass flow through the cold pass of the said heat exchanger is increased at low load conditions.

According to a further development of the invention an automatically controlled by-pass bridging over the throttle is provided in order to provide air sufficient to maintain the burner of the combustion chamber for the power turbine alight under all operating conditions.

Further objects and features of the invention will become apparent from a description of an embodiment thereof, given by way of example with reference to the accompanying drawings, and while I am describing and illustrating what may be considered a typical and particularly useful embodiment of my invention I wish it to be understood that I do not limit myself to the particular details and dimensions described and illustrated, for obvious modifications will occur to a person skilled in the art.

In the drawings:

Fig. 1 is a diagrammatic general arrangement of a gas turbine power plant according to the invention;

Fig. 2 is a graph in which the speed governor positions of the power turbine of the plant according to Fig. 1 are plotted against the actual R. P. M. of said power turbine;

Figure 1:
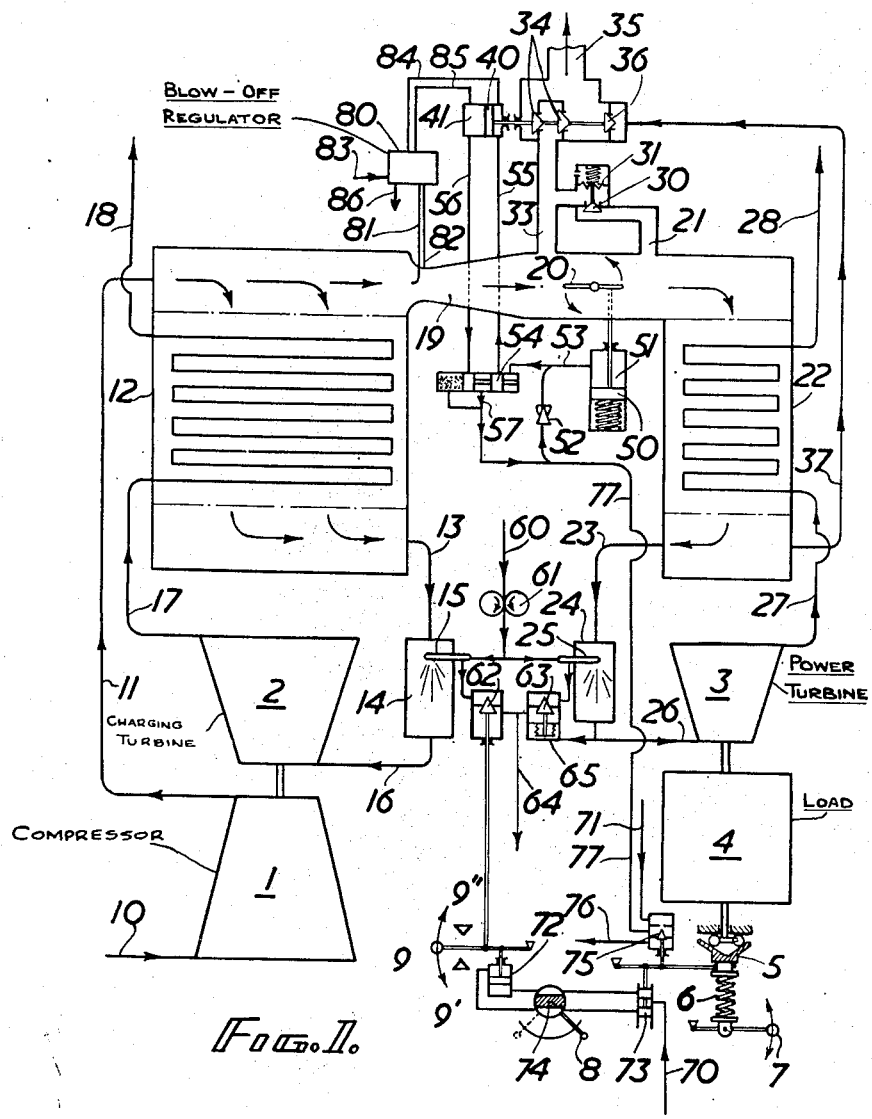

Referring first to Fig. 1, the gas turbine plant according to this embodiment comprises a charging set consisting of a turbo compressor 1 and a charging turbine 2 driving the same, and an independently rotatable power turbine 3 driving the useful load 4 which may be an alternator capable of operating at a widely varying speed of rotation, for example an alternator driving a synchronous motor coupled to the propeller of a ship.

The compressor 1 draws in air at 10 and delivers compressed air through the pipe 11 partly to the cold pass of a heat exchanger 12, the exit manifold of which is connected through a pipe 13 with a combustion chamber 14 having a burner 15. The combustion gases pass from the combustion chamber 14 through a pipe 16 to the aforesaid charging turbine 2, and from there through a pipe 17 and the hot pass of the heat exchanger 12 to be eventually discharged through the exhaust pipe 18.

The rest of the compressed air passes through a measuring venturi 19 and a throttle 20 into the cold pass of a second heat exchanger 22 which is connected by a pipe 23 to a second combustion chamber 24 having a burner 25. The combustion gases from the chamber 24 pass through a pipe 26 to the power turbine 3, and from there through a pipe 27, the hot pass of the heat exchanger 22 and a pipe 28 to exhaust.

There is a by-pass 21 arranged to bridge over the throttle 20 in the connection supplying compressed air to the heat exchanger 22. This by-pass is controlled by spring-loaded valve 30 which is operated by a diaphragm 31 equal in effective area to the valve and exposed to the pressure on the upstream side of the throttle 20 at one side and to the open atmosphere at the other side. As will be explained later in detail, this valve opens under the action of its spring when the pressure acting on the valve from the downstream side of throttle 20 falls below a predetermined minimum.

The upstream side of the throttle 20 is connected by a pipe 33 to a main blow-off valve 34 (shown as a double-seated valve) which when open allows air to blow-off at 35 from the upstream side of said throttle 20.

An auxiliary blow-off valve 36 is connected with the main blow-off valve 34 to be opened simultaneously. This auxilary blow-off valve 36 is connected by a pipe 37 with the heated air outlet manifold of the heat exchanger 22 which it connects to atmosphere at 35 when open.

The main blow-off valve 34 and the auxiliary blow-off valve 36 are both controlled by a piston 40 of a servomotor, the cylinder 41 of which can be supplied with pressure fluid in two different ways which will be explained later.

The throttle valve 20 is controlled by a spring-loaded servomotor piston 50 the pressure fluid control of which will be explained in connection with that of the aforesaid servomotor piston 40.

Fuel is supplied from a source (not shown) through pipe 60 and pump 61, preferably at constant pressure, in parallel to the burners 15, 25 of the two combustion chambers 14 and 25, respectively. These burners are of the known spill-control type in which the output is increased by restriction of a discharge path communicating with the vortex chamber of the burner, for example by variable area spill-control valves 62, 63 through which the spill discharges back to the fuel tank (not shown) through a pipe 64.

The spill-control valve 62 for the burner 15 of the charging turbine 2 is controlled alternatively by a control lever 9 or by a servomotor 72 to be described later, and the spill-control valve 63 is controlled in response to the pressure prevailing at the inlet of the power turbine 3, e. g. by a pressure sensitive capsule 65.

The power set, consisting of the power turbine 3 and the load 4, drives a speed governor 5 the sleeve of which is loaded by a spring 6 the force of which is adjustable by the main speed control lever 7.

Pressure fluid for the various servomotors of the plant is supplied from a source (not shown) through pipes 70, 71 and 83. Pipe 70 supplies the said servomotor 72 for the spill-control valve 62 through a piston valve 73 controlled by the speed governor 5 and through a switch-over valve 74 controlled by a hand lever 8, when in the position shown in full lines. When lever 8 is in the position shown in dotted lines, the servomotor cylinder 72 is cut off from the pressure fluid supply 70, and the spill-control valve 62 is operated manually by the said lever 9.

Stops 9', 9'' may be arranged to limit the travel of the lever 9 in both directions.

The pipe 71 supplies pressure fluid to a valve 75 comprising a fixed orifice and a variable orifice. The latter is controlled by a needle valve operated by the speed governor 5, and, when opened, allows pressure fluid to escape to the sump through a line 76, whereby the pressure in a chamber of valve 75 between the two orifices is made to vary in response to the position of the sleeve of the speed governor 5.

A pipe 77, branching off from said chamber of valve 75, supplies pressure fluid through a non-return valve 52 to the cylinder 51 of the servomotor piston 50 for the throttle 20. When the pressure in pipe 77 is reduced below that obtaining in cylinder 51, pressure fluid from the said cylinder 51 acts through pipe 53 on the right-hand end of a lightly spring loaded throw-over valve 54 and, when having shifted the latter to the left from the position shown in the drawing since the pressure acting on its left-hand end is that in pipe 77 and is less than that in pipe 53, said pressure fluid enters through pipe 55 the servomotor cylinder 41 on the right-hand side of the piston 40, while the space on the left-hand side of piston 40 of cylinder 41 is then connected through the throw-over valve 54 and pipes 57 to the lower pressure in pipe 77, the non-return valve 52 being then closed as stated.

A blow-off regulator 80 is connected by a pitot head 81 and a static head 82 to a venturi 19, and according to the velocity head therein relative to the static pressure therein admits pressure fluid from a supply pipe 83 through pipes 84, 85 to the right or left-hand side of piston 40 in the servomotor cylinder 41, connecting the other side thereof to drain at 86.

Figure 3:
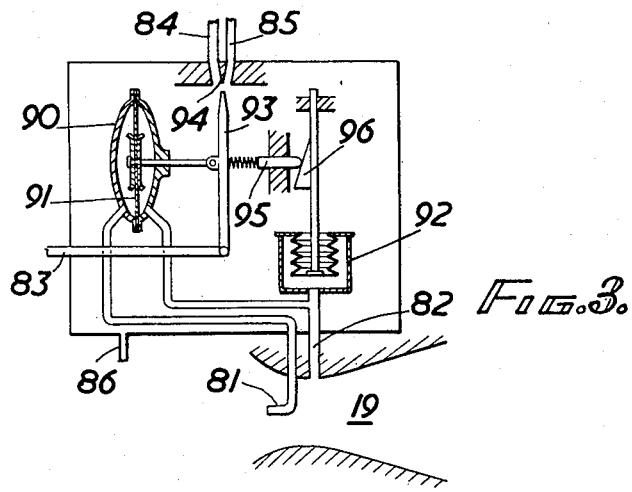
Fig. 3 is a diagrammatic representation of a slow-acting blow-off regulator of a known type used in conjunction with the plant according to Fig. 1.

A blow-off regulator of a well known type suitable for use in connection with the present invention is shown diagrammatically in Fig. 3 of the accompanying drawings.

It comprises a capsule 90 divided by a membrane 97 into two compartments one of which is connected by pipe 81 to the said pitot head in the throat of the venturi 19, and the other by pipe 82 to the said static head thereof. The latter is also connected to a bellows 92 the other side of which is open to the atmosphere.

The said bellows 92 is accordingly responsive to the static pressure P (gauge) in the throat of the venturi, while the capsule 90 is responsive to the pressure difference $\Delta P$ between the dynamic pressure and the static pressure in the said throat.

The membrane is connected to a swivelling oil jet pipe 93 which in the neutral position directs its jet against a partition 94 between the orifices of the pipes 84 and 85 leading to the servomotor cylinder 41 (see Fig. 1).

This jet pipe is also resiliently connected to a follower 95 in contact with a cam 96 connected to the bellows 92.

An increase in the static pressure P (gauge) will accordingly tend to direct the jet from the jet pipe 93 towards the orifice of the pipe 84 which would apply oil to the right-hand side of the piston 40 in the servomotor cylinder 41, i. e. in the sense of opening the blow-off valves 34, 36.

An increase in the pressure difference $\Delta P$ however will tend to direct the jet from the jet pipe 93 towards the orifice of the pipe 85 whereby the said blow-off valves would be closed by the servomotor.

Figure 4:
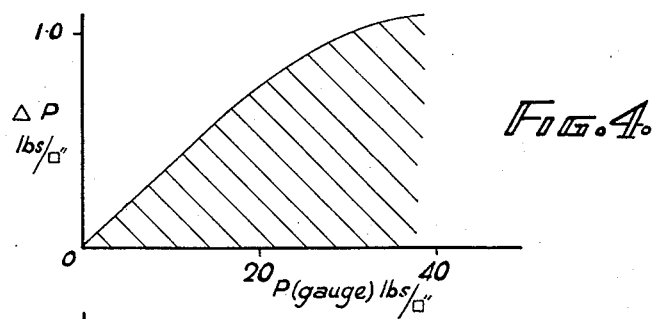
Fig. 4 is a graph showing the pressure differential between the pitot head and the static head of a venturi used in conjunction with the plant according to Fig. 1 plotted over the pressure (gauge) in the said venturi.

The effect of the pressure P (gauge) and the pressure difference $\Delta P$ are adjusted to balance one another according to the diagram Fig. 4 of the accompanying drawings the abscissae of which represent the pressure P (gauge) and the ordinates of which represent the pressure difference $\Delta P$. In the hatched area below the diagram line the blow-off valves 34, 36 are opened, in the clear area they are shut.

Provided the charging turbine fuel control lever 9 is not already against either its maximum or minimum stop 9', 9'' respectively, corresponding to 100% and approximately 10% power output, respectively, the speed of the power set (power turbine 3 and load 4) is normally kept constant by the action of the speed governor 5 at the value adjusted by the main speed control lever 7, the position of which determines the loading of the spring 6.

Assuming the valve 74 to be in the position for automatic control as shown in full lines in the drawing, any deviation in the speed of the power turbine from that set by the hand lever 7 will admit servo fluid to one side or other of the servomotor 72 and thus vary the opening of the spill-control valve 62 and consequently the rate of fuel injection to the combustion chamber 14 serving the charging turbine 2, the speed of the compressor 1 driven by the charging turbine 2 and hence the speed of the power turbine.

This action of the governor 5 is comparatively slow and is intended to prevent any gradual drift from the set speed without bringing into operation the much more rapid but necessarily wasteful method of control by throttling the air supply to the power turbine through valve 20 in the manner which will now be described.

If the speed of the power turbine exceeds the set speed by more than a predetermined amount of say 2%, the needle of valve 75 is withdrawn by the movement of the governor sleeve 5 sufficiently to reduce the pressure in pipe line 77 to a level at which it no longer balances the pressure required to compress the spring acting on piston 50 fully.

Under the action of this spring the throttle valve 20 then moves off its fully open stop at 2% above the set speed, and reaches its fully closed position at say 7% above the set speed.

When the throttle 20 closes, the mass flow, and accordingly the pressure difference ΔP drop, while the pressure P (gauge) upstream of the throttle 20 rises. Accordingly a condition within the hatched area of the graph of Fig. 4 of the accompanying drawings will be reached, and the blow-off regulator 80 will open the blow-off valve 34.

Figure 5:
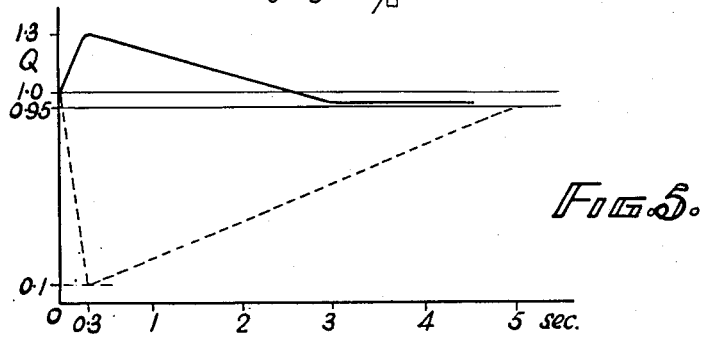
Fig. 5 is a graph in which the mass flow delivered by the compressor of the plant according to Fig. 1 is plotted against time.

However, as shown in the graph of Fig. 5 of the accompanying drawings the action of the blow-off regulator 80 is too slow; the mass flow Q through the venturi 19 would for example drop in accordance with the dotted line of the graph to about 0.1 of its rated value within 0.3 second, which would means violent surging of the dynamic compressor 1, and only after about 5 seconds a new equilibrium position at about 0.95 of the rated mass flow would be established.

However, with the quick-acting blow-off regulator device according to the invention, fluid displaced from cylinder 51 by the action of the said spring on piston 50 acts on the right-hand end of the bobbin of valve 54 so as to displace it to the left and open the flow path from the cylinder 51 through pipes 53 and 55 into the right-hand side of the servo cylinder 41 controlling the blow-off valve assembly 34. A corresponding amount of fluid is displaced from the left-hand side of the cylinder 41 through pipe 56, past the reduced diameter portion of the bobbin 54 and pipe 57.

By the movement of the piston 40 in the servo cylinder 41 the blow-off valve 34 opens at a rate more than sufficient to compensate for the reduction in flow of compressed air to the power turbine, which is achieved by suitably proportioning the relative areas of the servo piston 50 controlling the throttle valve 20 and of the servo piston 40 controlling the blow-off valve 34.

When the throttle valve 20 stops moving, the blow-off valve is thus too far open, and its position is then adjusted by the comparatively slow action of the blow-off regulator 80 until the flow through the measuring venturi 19 falls to say 0.95 of that corresponding to normal full throttle conditions at the same compressor delivery pressure.

This is represented in Fig. 5 of the accompanying drawings by the full line curve, which shows that the mass flow through the venturi 19 increases during the first 0.3 second to about 1.3 of the normal rate and then within 3 seconds approaches the 0.95 line from above which means that the actual mass flow never drops below 0.95 of the rated value.

If, on the other hand, the governor 5 is brought into an under-speed condition either by the movement of lever 7 or by a decrease in speed of power turbine 3, the pressure in line 77 rises towards the pressure of the servo oil supply from line 71, and fluid passes through the pipe 77 and the non-return valve 52 directly into the cylinder 51 controlling the throttle valve 20, without operating the servo piston 40 of the blow-off valve 34, which is closed comparatively slowly by the blow-off regulator 80 supplying motive fluid through pipes 84 and 85, until the velocity of the flow branched off from the charging turbine and measured by the pitot head 81 in conjunction with the static pressure measured in pipe 82 falls to say 0.95 of that obtaining at the same compressor delivery pressure under normal full throttle conditions.

Figure 2:
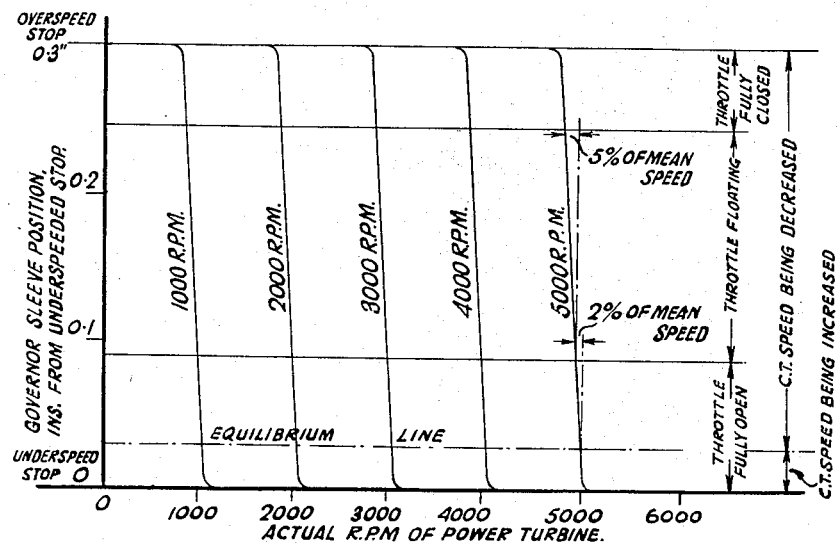

In Fig. 2 the positions of the sleeve of the speed governor 5 are plotted as ordinates over the actual number of revolutions of the power turbine 3 as abscissae. The basis line of the graph corresponds to the underspeed end position of the said sleeve, the top line to the overspeed end position thereof which is for example 0.3" removed from the underspeed end position. A horizontal equilibrium line is drawn in chain dotted lines, and two other horizontal lines, the meaning of which will be explained later, are also drawn.

Speed governor characteristics, slightly drooping, as required for stable operation, are drawn at intervals of 1000 R. P. M. from 1000 R. P. M. to 5000 R. P. M. For the speed characteristic for 5000 R. P. M. the principle of the dual control according to the invention is indicated in this graph.

By the slow-acting control means 73, 72, 62 the fuel supply to the combustion chamber 14 of the charging turbine 2 is increased when the sleeve of the speed governor 5 falls from the equilibrium line towards an underspeed condition indicated in the graph by the area below the chain dotted line, and is reduced when the said sleeve rises above this line into the overspeed range, whereby the speed and output of the charging set are increased or reduced and the power turbine is thereby gradually restored to the equilibrium condition. This is indicated on the extreme right-hand side of the graph.

The quick-acting means 75, 50, 20, 54, 40, 34, 36 are so adjusted that the throttle 20 remains fully open for the underspeed range below the chain dotted equilibrium line, and also for the range up to the first horizontal line which corresponds to an overspeed condition of say 2%. Small and temporary variations in the speed condition of the power turbine do not therefore result in blowing-off through valve 34.

When the overspeed condition exceeds 2%, the throttle 20 begins moving towards the closing position which is reached at 5% more overspeed, i. e. a total of 7% overspeed. The blow-off valves 34 and 36 are then opened more or less as described hereinabove. This throttling restores the condition of the power turbine 3 rapidly to the vicinity of the equilibrium line, leaving it to the said slow-acting control means to re-establish an accurate equilibrium.

In order to keep enough air flowing through the combustion chamber 24 to keep it alight with the throttle fully shut, a by-pass valve 30 is provided across throttle 20 which valve is controlled by a diaphragm 31 one side of which is open to atmosphere and spring loaded so as to maintain a minimum pressure of say 2 lbs. per square inch on the downstream side of the throttle, corresponding to a reasonable no-load idling speed of the power turbine 3.

An auxiliary blow-off valve 36 mechanically coupled to the main blow-off valve 34 opens a path from the hot manifold of the power turbine heat exchanger 22 through pipe 37 to atmosphere, this path having a flow passing capacity of the order of one half that of the power turbine 3. This auxiliary blow-off 36 reduces when open the effectiveness of the heat exchanger 22 and permits a reasonable air fuel ratio to be maintained in the combustion chamber 24 under no-load conditions when there is no heat drop across power turbine 3, and also helps to keep the temperature of the various parts of the heat exchanger 22 the same during throttled or unthrottled operation.

The fuel injection rate to the combustion chamber 24 is controlled purely in response to the inlet pressure to the turbine 3, acting on capsule 65, which pressure is a measure of the fluid flow.

The above system thus provides for normal unthrottled operation of the power turbine 3 by the very slow trimming action of the governor 5 on the fuel supply to the charging turbine backed up by the much more rapid control of throttling the air of the said power turbine 3 by means of the throttle while the speed of the charging turbine 2 is brought down to a level at which throttling is no longer necessary, or to the lowest speed at which the charging set is self sustaining.

During throttled operation, the air flow branched off from the charging turbine 2 is maintained at not less than 0.95 of its normal unthrottled value by means of the conventional blow-off regulator 80 backed up by the coupling of the blow-off valves 34, 36 and the air throttle 20 during closing (but not opening) movements of the latter.

This feature avoids any risk of the stalling of the compressor during the brief interval between a sudden closing of the throttle valve 20 and the opening of the blow-off valve 34 by the regulator 80.

The system thus provides for control of the speed of the power turbine 3 from idling to full load by means of single control lever 7. In extreme cases immediate control by the closing action of the throttle 20 takes place within approximately ⅓ of a second of the power turbine reaching an overspeed condition followed by adjustment of the speed of the charging turbine over perhaps 20 minutes or whatever period is necessary to avoid thermal strains during which period the throttle gradually re-opens.

Provision can be made in anticipation for sudden increases of load by moving the lever 8 to the hand operated position, so as to short-circuit the servo-cylinder 72, and bringing the charging turbine up to full speed by manual operation of lever 9, while the speed of the power turbine is held constant by the action of the governor which closes the throttle 20 progressively as the speed of the charging turbine is increased.

Figure 6:
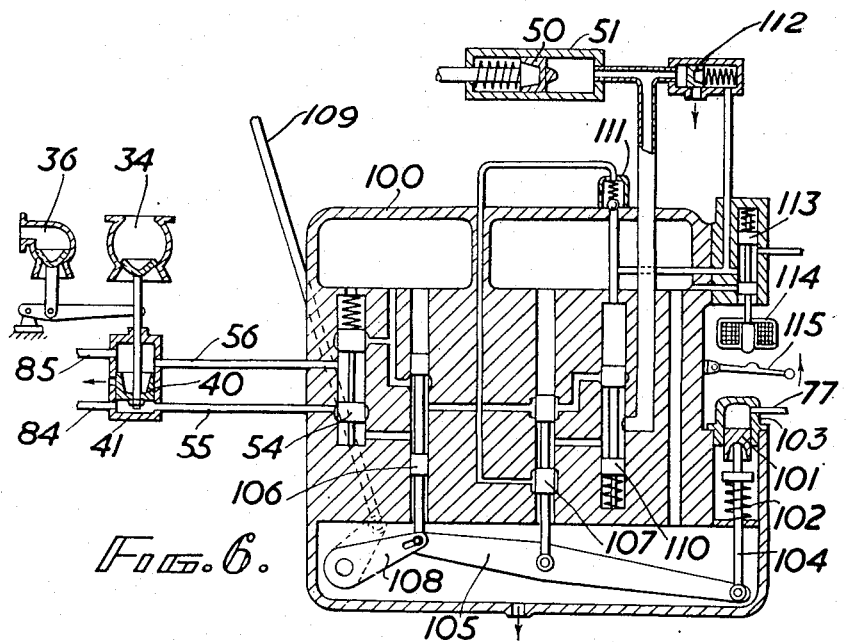
Fig. 6 shows a detail of Fig. 1 in section.

The control valves for the blow-off mechanism can be combined into a common chest of valves 100 as shown in Fig. 6. This chest may also include hydraulic relays.

Oil pressure from the intermediate chamber of valve 75 (see Fig. 1) is applied through pipe 77 to a relay piston 101 loaded by a spring 102 which piston is slidably fitted into a cap 103. The piston rod 104 of piston 101 is articulated to one end of a floating lever 105, the other end of which is articulated to the stem of a cut-off valve 106, and the middle portion of which is articulated to the stem of a pilot valve 107. Both the cut-off valve 106 and the pilot valve 107 are piston valves slidable in the chest 100 parallel to the relay piston 101.

The stem of the cut-off valve 106 is also articulated by linkage 108, 109 to the throttle 20 (Fig. 1) acting as a feed back from the closing movement thereof, as will be explained later.

There is also a spring-biassed trip valve 110 by-passing the pilot valve 107, and a spring-biassed non-return valve 111 associated therewith, and the spring-biassed throw-over valve 54 (see also Fig. 1).

The bore of the trip valve 110 is laterally connected to a cylinder 51 containing the spring-loaded piston 50 which operates the throttle 20 (Fig. 1).

The bore of the throw-over valve 54 is laterally connected by pipes 55 and 56 with the two ends of the servomotor cylinder 41, the piston 40 of which operates the main blow-off valve 34 and the auxiliary blow-off valve 36 which are diagrammatically illustrated in a slightly different way in Fig. 1. The connecting pipes 84, 85 to the slow-acting blow-off regulator 80 are also indicated in Fig. 6.

A spring-biassed relief valve 112 may be connected to the cylinder 50 on one side (to ensure closing of the throttle if anything sticks) and an electrical trip valve 113 on the other side, which trip valve controls the supply of hydraulic pressure fluid to the relays in the chest 100. This trip valve is controlled by a solenoid 114, is spring-biassed towards the tripping position, and can be reset by a reset lever 115.

The operation of the valves and relays combined into chest 100 is as follows:

Pressure oil of a pressure determined by the position of the speed governor sleeve 5 is transmitted from the valve 75 (see Fig. 1) through pipe 77 to the plunger 101, whereby the position of the right-hand side end of the floating lever 105 is determined, the left-hand side end of which is pivoted about a pivot point which may be assumed to be fixed as long as the throttle 20 is in the fully open position. The movements of the piston 101 are accordingly copied by the pilot valve 107 which controls the flow of pressure oil coming past the trip valves 113 and 110 and non-return valve 111 to the servomotor cylinder 51, the piston of which is accordingly moved by relay action in response to variations in the pressure of the oil supplied at 77, although not directly by such pressure oil as diagrammatically shown in Fig. 1.

The discharge side of the pilot valve 107 is connected straight to drain when the throttle 20 is in or near the fully open position. This path is however blocked, when the throttle 20 is closed by more than about 10°, by the plunger of the cut-off valve 106 which is articulated to the left-hand side end of the floating lever 105, which follows the movements of the throttle 20 through the linkage 108, 109. The discharge from the pilot valve 107 then acts on the lower end of the lightly spring-loaded throw-over valve 54 and lifts the same so as to uncover the port through which it passes through pipe 55 to the underside of the servomotor cylinder 41, the piston 40 of which accordingly opens the blow-off valves 34, 36. The upper part of the throw-over valve 54 simultaneously opens the upper side of the servomotor cylinder 41 to drain through pipe 56. Auxiliary drain ports on the opening side of the servomotor cylinder 41 are uncovered by its piston 40 at the end of the stroke.

By the linkage 109, 108 the movement of the throttle 20 also restores the pilot valve 107 to its neutral position, the floating lever 105 then pivoting about its right-hand side end (follow-up action).

The trip valve 110 is normally held down against its spring by the oil pressure supplied past the trip valve 113, but when this pressure fails by the trip valve 113 being tripped or otherwise, the trip valve 110 rises under its spring bias and by-passes the pilot valve 107.

In order to guard against the possibility of any one of the plungers of the relay valve chest 100 or of the piston 50 of the servomotor 51 getting stuck and thus preventing the throttle 20 from closing, when any one of the trips operate, an alternative drain path is opened by the relief valve 112, through which the piston 50 can discharge the oil directly to drain under the action of its spring, which in this modification, too, operates to close the throttle 20. The said relief valve 112 is spring-biassed and normally loaded by pressure oil coming past the trip valve 113 in the sense of keeping its drain opening closed.

What I claim as my invention and desire to secure by Letters Patent is:

1. A gas turbine power plant comprising in combination: a power turbine delivering useful power, a speed governor driven by the said power turbine, an independently rotatable charging turbine, a dynamic compressor driven by the said charging turbine, a first combustion chamber in supply connection between the said compressor and the said charging turbine, a second combustion chamber in supply connection between the said compressor and the said power turbine, a slow-acting control means responsive to the said speed governor and controlling the fuel supply to the said first combustion chamber in the sense of increasing the fuel supply when the speed of the power turbine is less than a predetermined speed, a throttle arranged between the said compressor and the said second combustion chamber, and a quick-acting device responsive to the said speed governor and operating the said throttle in the sense of progressively closing the said throttle upon the said power turbine reaching a predetermined overspeed condition.

2. A gas turbine power plant comprising in combination: a power turbine delivering useful power, a speed governor driven by the said power turbine, an independently rotatable charging turbine, a dynamic compressor driven by the said charging turbine, a separate combustion chamber arranged at the entrance of each of the said turbines, the said compressor being in supply connection to both the said combustion chambers in parallel, a slow-acting control means responsive to the said speed governor and controlling the fuel supply to the combustion chamber of the said charging turbine in the sense of increasing the said fuel supply when the speed of the said power turbine is less than a predetermined speed and reducing the said fuel supply upon the said power turbine exceeding said speed, a blow-off valve and a throttle arranged consecutively between the said compressor and the combustion chamber of the said power turbine, and a quick-acting device including spring means biassing the said throttle into the closed position, a hydraulic servomotor operatively connected to the said blow-off valve and to the said throttle and overriding the said spring means upon application of a predetermined hydraulic pressure, and a control valve controlling the said fluid pressure responsive to the said speed governor and thereby progressively operating the said blow-off valve and throttle in the sense of opening the said blow-off valve and closing the said throttle upon the said power turbine reaching a predetermined overspeed condition.

3. A gas turbine power plant comprising in combination: a power turbine delivering useful power, a speed governor driven by the said power turbine, an independently rotatable charging turbine, a dynamic compressor driven by the said charging turbine, a separate combustion chamber arranged at the entrance of each of the said turbines, the said compressor being in supply connection to both the said combustion chambers in parallel, a slow acting control means responsive to the said speed governor and controlling the fuel supply to the combustion chamber of the said charging turbine in the sense of increasing the said fuel supply when the speed of the said power turbine is less than a predetermined speed and reducing the said fuel supply upon the said power turbine exceeding said speed, a blow-off valve and a throttle arranged consecutively between the said compressor and the combustion chamber of the said power turbine, and a quick-acting device including spring means biassing the said throttle into the closed position, a hydraulic servomotor operatively connected to the said blow-off valve and to the said throttle and overriding the said spring means upon application of a predetermined hydraulic pressure, and a control valve having a fixed orifice connected to an outside source of substantially constant hydraulic pressure, a variable orifice connected to drain, a chamber arranged between the said two orifices and connected to the said servomotor, and a valve needle controlling the said variable orifice responsive to the said speed governor and thereby progressively operating the said blow-off valve and throttle in the sense of opening the said blow-off valve and closing the said throttle upon the said power turbine reaching a predetermined overspeed condition.

4. A gas turbine power plant comprising in combination: a power turbine delivering useful power, a speed governor driven by the said power turbine, an independently rotatable charging turbine, a dynamic compressor driven by the said charging turbine, a separate combustion chamber arranged at the entrance of each of the said turbines, the said compressor being in supply connection to both the said combustion chambers in parallel, a slow-acting control means responsive to the said speed governor and controlling the fuel supply to the combustion chamber of the said charging turbine in the sense of increasing the said fuel supply upon the said power turbine dropping below its set speed and reducing the said fuel supply upon the said power turbine exceeding its set speed, a blow-off valve and a throttle arranged consecutively between the said compressor and the combustion chamber of the said power turbine, and a quick-acting device including spring means biasing the said throttle into the closed position, a hydraulic servomotor operatively connected to the said throttle and overriding the said spring means upon application of a predetermined hydraulic pressure, and a control valve having a fixed orifice connected to an outside source of substantially constant hydraulic pressure, a variable orifice connected to drain, a chamber arranged between the said two orifices and connected to the said servomotor, and a valve needle controlling the said variable orifice, a second hydraulic servomotor operatively connected to the said blow-off valve, a throw-over valve spring-biassed to a position shutting off the said second hydraulic servomotor and connected to the said first hydraulic servomotor in the sense of connecting the latter to the said second servomotor and to the said chamber, respectively, upon the hydraulic pressure in the said first servomotor exceeding that in the said chamber, a non-return valve being arranged between the said chamber and the said first servomotor, the said valve needle being responsive to the said speed governor and thereby operating the said blow-off valve and throttle in the sense of progressively opening the said blow-off valve and closing the said throttle upon the said power turbine reaching a predetermined overspeed condition.

5. A gas turbine power plant as claimed in claim 4, comprising in addition: a Venturi-nozzle arranged between the said compressor and the said blow-off valve, a Pitot head and a static head connected to the throat of the said Venturi-nozzle, and a slow-acting hydraulic relay responsive to the pressure differential between the said Pitot head and static head and to the static pressure (gauge) of the said static head and operatively connected to said second hydraulic servomotor in parallel to the said throw-over valve, the said hydraulic relay opening the said blow-off valve responsive to the said pressure differential decreasing below a predetermined value relative to the said static pressure (gauge) and closing the said blow-off valve responsive to the said pressure differential exceeding a predetermined value relative to the said static pressure (gauge), the hydraulic pressure of said first servomotor overriding the said slow-acting hydraulic relay.

6. A gas turbine power plant comprising in combination: a power turbine delivering useful power, a speed governor driven by the said power turbine, an independently rotatable charging turbine, a dynamic compressor driven by the said charging turbine, a separate combustion chamber arranged at the entrance of each of the said turbines, two separate heat exchangers each having a cold pass and a hot pass, the entries to the cold passes of the said heat exchangers being connected in parallel to the delivery of said compressor and the exits thereof to the said separate combustion chambers, respectively, and the hot passes of the said heat exchangers being connected to the exhaust of the said power turbine and charging turbine, respectively, and to atmosphere, a blow-off valve and a throttle arranged consecutively between the said compressor and the cold pass of the heat exchanger associated with the said power turbine, a slow-acting control means responsive to the said speed governor and controlling the fuel supply to the combustion chamber of the said charging turbine, and a quick-acting device responsive to the said speed governor and progressively controlling the said throttle and blow-off valve in the sense of closing the said throttle and opening the said blow-off valve upon the said power turbine reaching a predetermined overspeed condition.

7. A gas turbine power plant comprising in combination: a power turbine delivering useful power, a speed governor driven by the said power turbine, an independently rotatable charging turbine, a dynamic compressor driven by the said charging turbine, a separate combustion chamber arranged at the entrance of each of the said turbines, two separate heat exchangers each having a cold pass and a hot pass, the entries to the cold passes of the said heat exchangers being connected in parallel to the delivery of the said compressor and the exits thereof to the said separate combustion chambers, respectively, and the hot passes of the said heat exchangers being connected to the exhaust of the said power turbine and charging turbine, respectively, and to atmosphere, a main blow-off valve and a throttle arranged consecutively between the said compressor and the cold pass of the heat exchanger associated with the said power turbine, an auxiliary blow-off valve coupled to the said main blow-off valve and branched off from between the cold pass of the said heat exchanger and the combustion chamber associated with the said power turbine.

8. A gas turbine power plant comprising in combination: a power turbine delivering useful power, a speed governor driven by the said power turbine, an independently rotatable charging turbine, a dynamic compressor driven by the said charging turbine, a separate combustion chamber arranged at the entrance of each of the said turbines, the said compressor being in supply connection to both said combustion chambers in parallel, a slow-acting control means responsive to the said speed governor and controlling the fuel supply to the combustion chamber of the said charging turbine, a blow-off valve and a throttle arranged consecutively between the said compressor and the combustion chamber of said power turbine, a by-pass bridging the said throttle, a valve in the said by-pass, a spring biassing the said valve towards the open position, a diaphragm having the same effective area as, and operatively connected to, the said valve, and exposed to the pressure upstream the said throttle at one side and to atmospheric pressure at the other side, the pressure downstream of the said throttle biassing the said by-pass valve towards the closed position, and a quick-acting device responsive to the said speed governor and controlling the said throttle and blow-off valve in the sense of closing the said throttle and opening the said blow-off valve upon the said power turbine reaching a predetermined overspeed condition.

9. A gas turbine power plant comprising in combination: a power turbine delivering useful power, a speed governor driven by said power turbine including a sleeve, a spring loading the said sleeve, and an adjustment lever controlling the force of the said spring, an independently rotatable charging turbine, a dynamic compressor driven by the said charging turbine, a separate combustion chamber arranged at the entrance of each of the said turbines, the said compressor being in supply connection with both the said combustion chambers in parallel, a slow-acting control means responsive to the position of the said speed governor sleeve and controlling the fuel supply to the said charging turbine, a quick-acting device responsive to the position of the said speed governor sleeve, and a blow-off valve and a throttle consecutively arranged in the supply connection from the said compressor to the combustion chamber of the said power turbine, the said quick-acting device progressively controlling the said blow-off valve and throttle in the sense of opening the said blow-off valve and closing the said throttle upon the said power turbine reaching a predetermined overspeed condition.

10. A gas turbine power plant comprising in combination: a power turbine delivering useful power, a speed governor driven by said power turbine, an independently rotatable charging turbine, a dynamic compressor driven by the said charging turbine, a separate combustion chamber arranged at the entrance of each of the said turbines, the said compressor being in supply connection with both the said combustion chambers in parallel, a slow-acting control means responsive to the said speed governor and in operative connection with the combustion chamber of the said charging turbine in the sense of automatically increasing the fuel supply to the said combustion chamber upon the said power turbine dropping below its set speed and reducing the said fuel supply upon the said power turbine exceeding its set speed, a manual control means of the said combustion chamber of the charging turbine overriding the said automatic slow-acting control means, a quick-acting device responsive to the said speed governor, a blow-off valve and a throttle consecutively arranged in the supply connection from the said compressor to the combustion chamber of the said power turbine, the said quick-acting device progressively controlling the said blow-off valve and throttle in the sense of opening the said blow-off valve and closing the said throttle upon the said power turbine reaching a predetermined overspeed condition.

11. A plant comprising in combination: a dynamic compressor, a prime mover driving the said compressor, a consumer of varying quantities of the medium compressed by the said compressor in supply pipe connection with the latter, a Venturi-nozzle, a blow-off valve and a throttle arranged consecutively between the said compressor and the said consumer, a Pitot head and a static head arranged at the throat of the said Venturi-nozzle, a slow-acting hydraulic relay responsive to the pressure differential between the pressures at the said Pitot head and static head and to the static pressure (gauge) at the said static head, a hydraulic servomotor operatively connected to the said slow-acting relay and to the said blow-off valve in the sense of progressively opening the said valve upon the said pressure differential falling below a predetermined value relative to the said static pressure (gauge) and progressively closing the said blow-off valve upon the said pressure differential exceeding said predetermined value relative to the said pressure (gauge), and a quick-acting device responsive to the consumption of the said consumer and operatively connected to the said throttle and to the said servomotor in the sense of closing the said throttle, and opening the said blow-off valve overriding the said slow-acting relay upon the said consumption falling below a predetermined value.

12. A plant comprising in combination: a dynamic compressor, a prime mover driving the said compressor, a consumer of varying quantities of the medium compressed by the said compressor in supply pipe connection with the latter, a Venturi-nozzle, a blow-off valve and a throttle arranged consecutively between the said compressor and the said consumer, a Pitot head and a static head arranged at the throat of the said Venturi-nozzle, a slow-acting hydraulic relay responsive to the pressure differential between the pressures at the said Pitot head and static head and to the static pressure (gauge) at the said static head, a hydraulic servomotor operatively connected to the said slow-acting relay and to the said blow-off valve in the sense of progressively opening the said valve upon the said pressure differential falling below a predetermined value relative to the said static pressure (gauge) and progressively closing the said blow-off valve upon the said pressure differential exceeding said predetermined value relative to the said pressure (gauge), and a quick-acting device responsive to the consumption of the said consumer and operatively connected to the said throttle and to the said servomotor in the sense of progressively closing the said throttle and progressively opening the said blow-off valve overriding the said slow-acting relay upon the said consumption falling below a predetermined value, the said quick-acting device opening the said blow-off valve wider than restricting the passage through the said throttle.

13. A plant comprising in combination: a dynamic compressor, a prime mover driving the said compressor, a consumer of varying quantities of the medium compressed by the said compressor in supply pipe connection with the latter, a Venturi-nozzle, a blow-off valve and a throttle arranged consecutively between the said compressor and the said consumer, a Pitot head and a static head arranged at the throat of the said Venturi-nozzle, a slow acting hydraulic relay responsive to the relation between the pressure differential of the pressures at the said Pitot head and static head and to the static pressure (gauge) at the said static head, a first hydraulic servomotor operatively connected to the said throttle, a spring biassing the said throttle towards the closed position, a quick-acting device connected to the said servomotor applying hydraulic pressure overriding the said spring to the said servomotor in the sense of opening the said throttle, a second hydraulic servomotor operatively connected to the said slow-acting relay and to the said blow-off valve in the sense of progressively opening the said valve upon the said pressure differential falling below a predetermined value relative to the said static pressure (gauge) and progressively closing the said blow-off valve upon the said pressure differential exceeding the said predetermined value relative to the said pressure (gauge), while the throttle is opening or stationary, and moved against its biassing spring by the oil pressure from said first servomotor acting on its opposite end when the said throttle is closing whereby the oil discharged from the said first servomotor is passed into the opening side of the said second servomotor, which is proportioned to open thereby the said blow-off valve to an extent which more than compensates for the reduction in the flow of fluid through the said throttle; the other side of the said second servomotor being simultaneously connected through the said throw-over valve to a point of lower pressure.

REUEL DUNCAN van MILLINGEN.

References Cited in the file of this patent
UNITED STATES PATENTS

| Number | Name | Date |
|---|---|---|
| 2,365,616 | Zweifel | Dec. 19, 1944 |